US012503882B2

(12) United States Patent
Lehner, Jr. et al.

(10) Patent No.: US 12,503,882 B2
(45) Date of Patent: Dec. 23, 2025

(54) EXIT DEVICE NIGHT LATCH ADAPTER

(71) Applicant: Schlage Lock Company LLC, Carmel, IN (US)

(72) Inventors: Jack R. Lehner, Jr., Indianapolis, IN (US); Paul R. Arlinghaus, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 543 days.

(21) Appl. No.: 17/834,368

(22) Filed: Jun. 7, 2022

(65) Prior Publication Data

US 2023/0392411 A1 Dec. 7, 2023

(51) Int. Cl.

| | |
|---|---|
| ***E05B 15/10*** | (2006.01) |
| ***E05B 9/00*** | (2006.01) |
| ***E05B 9/08*** | (2006.01) |
| ***E05B 65/10*** | (2006.01) |

(52) U.S. Cl.

CPC ............ *E05B 15/104* (2013.01); *E05B 9/002* (2013.01); *E05B 9/08* (2013.01); *E05B 65/1053* (2013.01)

(58) Field of Classification Search

CPC .... E05B 15/104; E05B 65/1053; E05B 9/002; E05B 9/08; E05B 65/10; E05B 65/102; E05B 65/1046; E05B 65/1093; E05B 63/22; E05B 13/002; E05B 13/007; E05B 13/101; E05B 63/08

See application file for complete search history.

(56) References Cited

U.S. PATENT DOCUMENTS

| | | | | |
|---|---|---|---|---|
| 3,730,574 A | | 5/1973 | Zawadzki | |
| 4,083,590 A | * | 4/1978 | Folger | E05B 65/1053 292/168 |
| 4,741,563 A | * | 5/1988 | Cohrs | E05B 65/1046 292/168 |
| 4,961,330 A | * | 10/1990 | Evans | E05B 65/1053 70/92 |
| 4,969,916 A | * | 11/1990 | Weinerman | E05B 9/08 292/DIG. 31 |
| 7,634,927 B1 | * | 12/2009 | Tien | E05B 13/004 70/DIG. 60 |

(Continued)

OTHER PUBLICATIONS

International Search Report, International Searching Authority, International Application No. PCT/US2023/024712, Jan. 24, 2024, 4 pages.

(Continued)

*Primary Examiner* — Christine M Mills
*Assistant Examiner* — Faria F Ahmad
(74) *Attorney, Agent, or Firm* — Taft Stettinius & Hollister LLP

(57) ABSTRACT

An exemplary pushbar assembly generally includes a mounting assembly, a latch control assembly movably mounted to the mounting assembly, a pushbar operable to actuate the latch control assembly, a master cam rotatably mounted to the mounting assembly, a slide plate, and an insert. The slide plate is slidably mounted to the mounting assembly, and is configured to move between a locking position and an unlocking position in response to rotation of the master cam between a locking orientation and an unlocking orientation. The insert is configured to limit rotation of the master cam to a predetermined angular range less than 360°.

24 Claims, 13 Drawing Sheets

(56) References Cited

U.S. PATENT DOCUMENTS

| | | | | | |
|---|---|---|---|---|---|
| 8,011,702 | B2 * | 9/2011 | Tien | E05B 65/1006 | 70/92 |
| 8,201,857 | B2 * | 6/2012 | Tien | E05B 65/1053 | 70/92 |
| 8,528,946 | B2 * | 9/2013 | Shen | E05B 65/1053 | 70/92 |
| 8,826,705 | B2 * | 9/2014 | Tien | E05B 53/00 | 70/210 |
| 9,140,032 | B2 * | 9/2015 | Lin | E05B 17/0066 | |
| 9,273,495 | B2 * | 3/2016 | Tien | E05B 65/10 | |
| 11,414,892 | B2 * | 8/2022 | Holtgrewe | E05B 65/1006 | |
| 11,851,915 | B2 * | 12/2023 | Kumar | F16H 1/04 | |
| 2001/0006293 | A1 * | 7/2001 | Rupp | E05B 65/1053 | 292/336.3 |
| 2005/0057051 | A1 | 3/2005 | Bartos | | |
| 2005/0257583 | A1 * | 11/2005 | Lin | E05B 13/005 | 70/472 |
| 2006/0010942 | A1 * | 1/2006 | Toloday | E05B 63/0065 | 70/210 |
| 2009/0266120 | A1 * | 10/2009 | Tien | E05B 65/1053 | 70/107 |
| 2009/0308112 | A1 * | 12/2009 | Uyeda | E05C 7/04 | 70/91 |
| 2010/0251788 | A1 * | 10/2010 | Lin | E05B 13/005 | 70/472 |
| 2011/0239712 | A1 * | 10/2011 | Tien | E05B 65/1053 | 70/92 |
| 2014/0102155 | A1 * | 4/2014 | Lin | E05C 9/046 | 70/92 |
| 2015/0167354 | A1 * | 6/2015 | Tien | E05B 9/08 | 292/92 |
| 2015/0252592 | A1 * | 9/2015 | Tien | E05B 65/10 | 70/92 |
| 2016/0340930 | A1 * | 11/2016 | Schaeffer | E05B 15/02 | |
| 2021/0164267 | A1 | 6/2021 | Holtgrewe et al. | | |
| 2021/0332618 | A1 * | 10/2021 | Kumar | F16H 1/04 | |
| 2024/0125151 | A1 * | 4/2024 | Kumar | E05B 63/042 | |

OTHER PUBLICATIONS

Written Opinion of the International Searching Authority, International Searching Authority, International Application No. PCT/US2023/024712, Jan. 24, 2024, 7 pages.

Dormakaba; 9000 Series Premium Exit Devices Catalog; 72 pages.

Yale; 7000 Series Architectural Exit Device Catalog; 64 pages.

Canadian Examination Report; Canadian Intellectual Property Office; Canadian Patent Application No. 3,258,858; Apr. 3, 2025; 5 pages.

* cited by examiner

EXIT DEVICE NIGHT LATCH ADAPTER

TECHNICAL FIELD

The present disclosure generally relates to access control devices, and more particularly but not exclusively relates to exit devices with a night latch function.

BACKGROUND

Exit devices can have several functions to fulfill particular customer needs. In some circumstances, customers may desire a function referred to as the "night latch" function. In certain existing exit devices, the night latch function involves the use of a key in a lock cylinder to temporarily retract the latch(es) of the exit device. However, this conventional night latch function may suffer from drawbacks and limitations, such as those related to the force required to turn the key. For these reasons among others, there remains a need for further improvements in this technological field.

SUMMARY

An exemplary pushbar assembly generally includes a mounting assembly, a latch control assembly movably mounted to the mounting assembly, a pushbar operable to actuate the latch control assembly, a master cam rotatably mounted to the mounting assembly, a slide plate, and an insert. The slide plate is slidably mounted to the mounting assembly, and is configured to move between a locking position and an unlocking position in response to rotation of the master cam between a locking orientation and an unlocking orientation. The insert is configured to limit rotation of the master cam to a predetermined angular range less than 360°. Further embodiments, forms, features, and aspects of the present application shall become apparent from the description and figures provided herewith.

DETAILED DESCRIPTION OF ILLUSTRATIVE EMBODIMENTS

Figure 1:
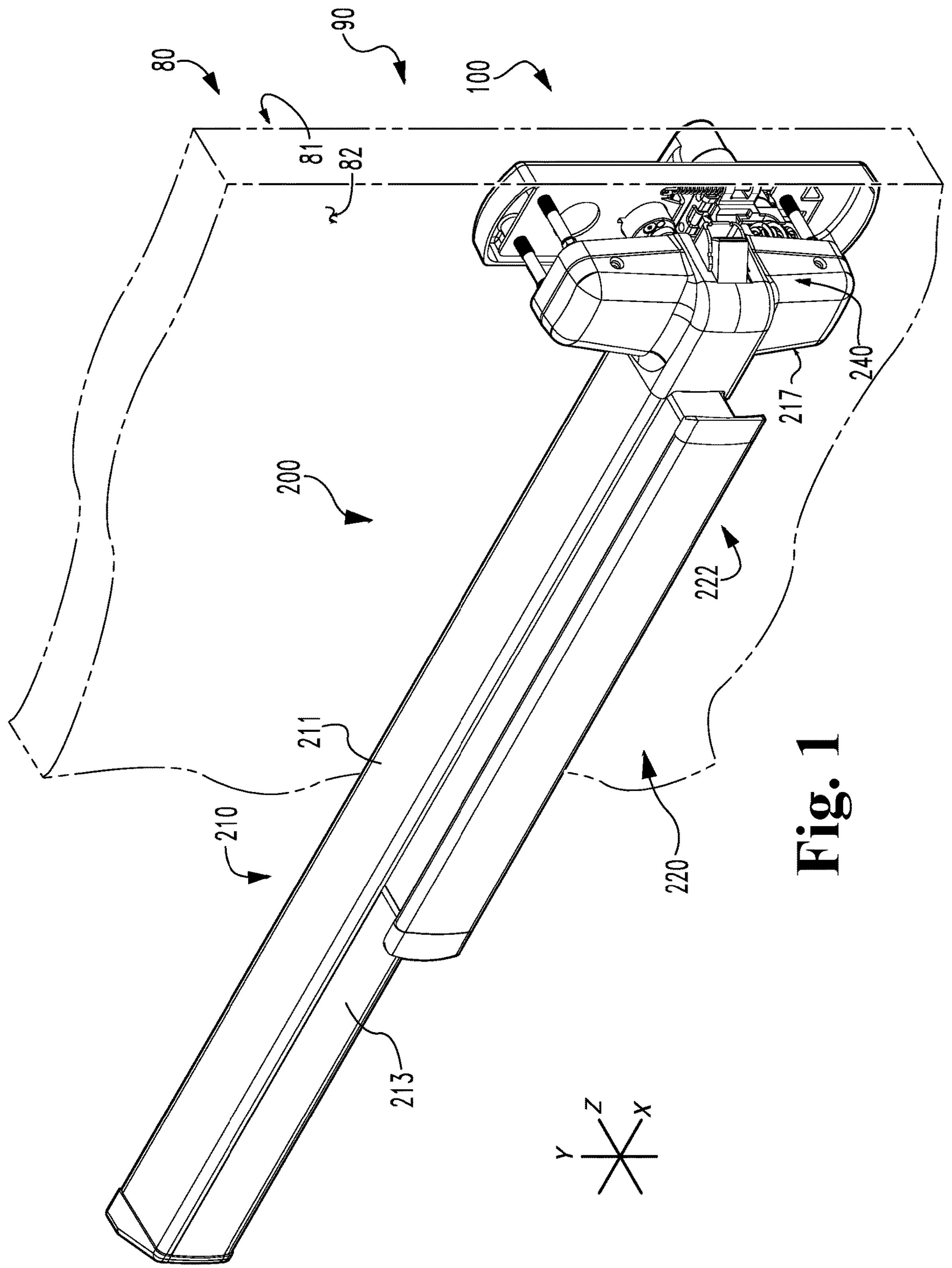
FIG. 1 is a perspective view of an exit device assembly according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. In the coordinate system illustrated in FIG. 1, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a door 80 having installed thereon an exit device assembly 90 according to certain embodiments. The door 80 generally includes an outer or non-egress side 81 and an inner or egress side 82 opposite the non-egress side 81. When the door 80 is in its closed position, the non-egress side 81 faces an exterior or outer region, and the egress side 82 faces an interior or access-controlled region. The exit device assembly 90 generally includes a trim 100 installed to the non-egress side 81, and a pushbar assembly 200 installed to the egress side 82. As described herein, the illustrated pushbar assembly 200 includes a latch mechanism 240 and a pushbar 222 operable to actuate the latch mechanism 240, and the trim 100 is at least selectively operable to actuate the latch mechanism 240.

Figure 2:
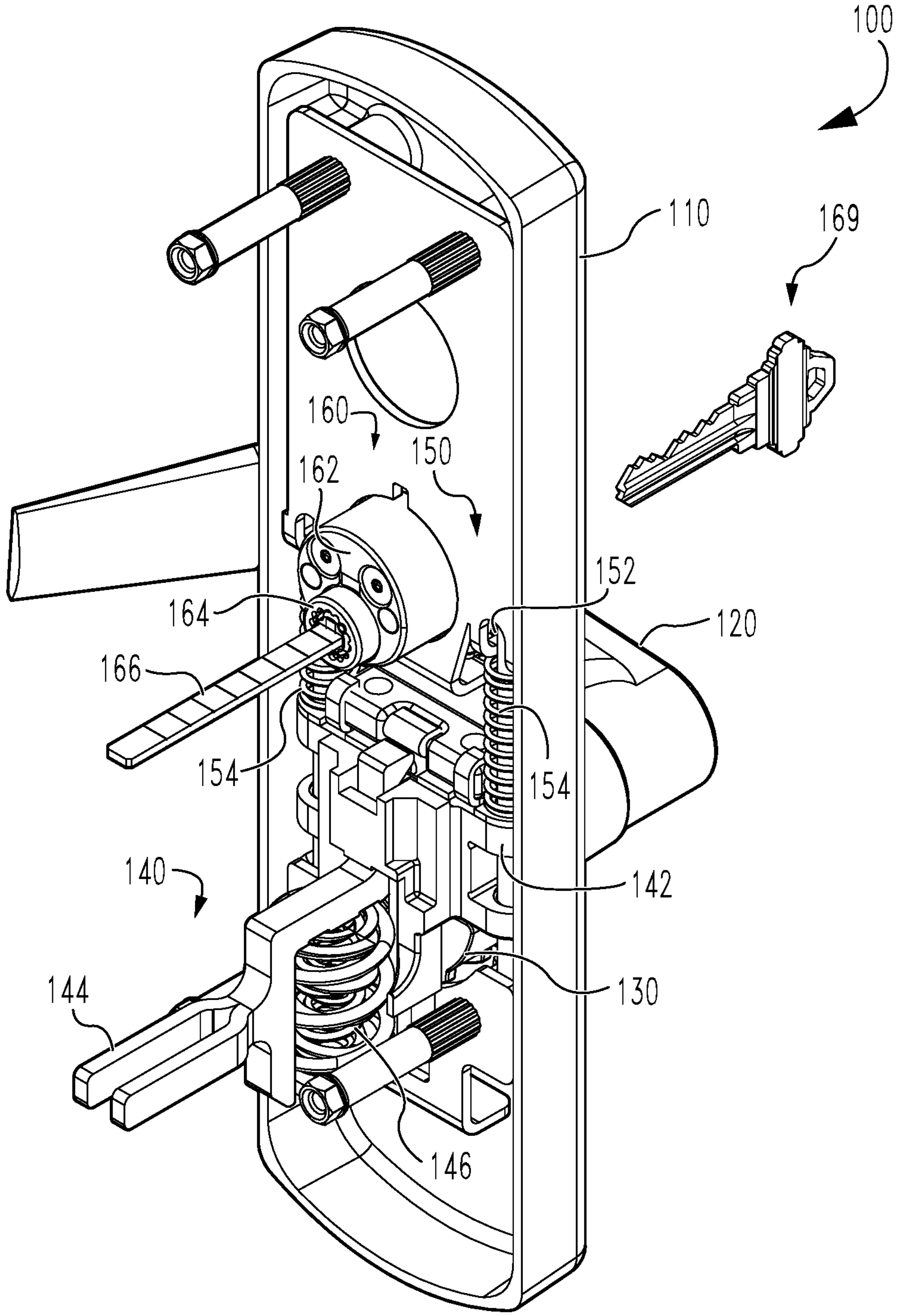
FIG. 2 is a perspective view of a trim of the exit device assembly illustrated in FIG. 1.

With additional reference to FIG. 2, the outside trim 100 generally includes an escutcheon 110, a handle 120 rotatably mounted to the escutcheon 110, a cam 130 rotationally coupled with the handle 120, a lift finger assembly 140 engaged with the cam 130, a bias mechanism 150 biasing the lift finger assembly 140 toward a home or deactuated position, and a lock cylinder 160 mounted to the escutcheon 110. As described herein, the lock cylinder 160 is operable to transition the exit device assembly 90 between a locked state and an unlocked state to allow the handle 120 to actuate the latch mechanism 240.

The escutcheon 110 is configured for mounting to the non-egress side 81 of the door 80, and provides a housing to which other components of the trim 100 are mounted.

The handle 120 is rotatably mounted to the escutcheon 110 and is operable to rotate the cam 130. In the illustrated form, the handle 120 is provided in the form of a lever handle. It is also contemplated that the handle 120 may be provided in another form, such as that of a knob handle. As described herein, when the exit device assembly 90 is in its unlocked state, rotation of the handle 120 actuates the latch mechanism 240.

The cam 130 is rotatably mounted in the escutcheon 110, and is engaged with the handle 120 such that rotation of the handle 120 causes a corresponding rotation of the cam 130. The cam 130 is also engaged with the lift finger assembly 140 such that rotation of the cam 130 in either direction actuates the lift finger assembly 140.

The lift finger assembly 140 generally includes a drive piece 142 engaged with the cam 130, a driven piece 144 that extends through the door 80 and into engagement with the pushbar assembly 200, and a spring 146 engaged between the drive piece 142 and the driven piece 144. The drive piece 142 is engaged with the cam 130 such that rotation of the cam 130 drives the drive piece 142 from a lower deactuated position to an upper actuated position. When the exit device assembly 90 is unlocked, such movement of the drive piece 142 is transmitted to the driven piece 144 by the spring 146 such that the driven piece 144 actuates the latch mechanism 240 as described herein. If the handle 120 is rotated while the driven piece 144 is blocked from moving to its upper or actuated position, rotation of the handle 120 may cause actuation of the drive piece 142 while the spring 146 permits the driven piece 144 to remain in its deactuated position.

The bias mechanism 150 generally includes a pair of posts 152 that are mounted to the escutcheon 110, and a pair of springs 154, each of which is mounted to a corresponding one of the posts 152. The springs 154 are engaged between a base plate 102 and the drive piece 142 such that the springs 154 bias the drive piece 142 downward toward its deactuated position.

The lock cylinder 160 is operable by a key 169, and generally includes a shell 162 rotationally coupled with the escutcheon 110, a plug 164 rotatably mounted in the shell 162, a tailpiece 166 operable to be rotated by the plug 164, and a tumbler system configured to selectively prevent rotation of the plug 164 relative to the shell 162. When the correct key 169 is inserted into the lock cylinder 160, the tumbler system allows the key 169 to rotate the plug 164 to thereby rotate the tailpiece 166. As is typical of lock cylinders, rotation of the plug 164 from a home position to a rotated position causes the tumbler system to trap the shank of the key 169 within the plug 164 such that the key 169 can only be removed when the plug 164 is in its home position.

Figure 3:
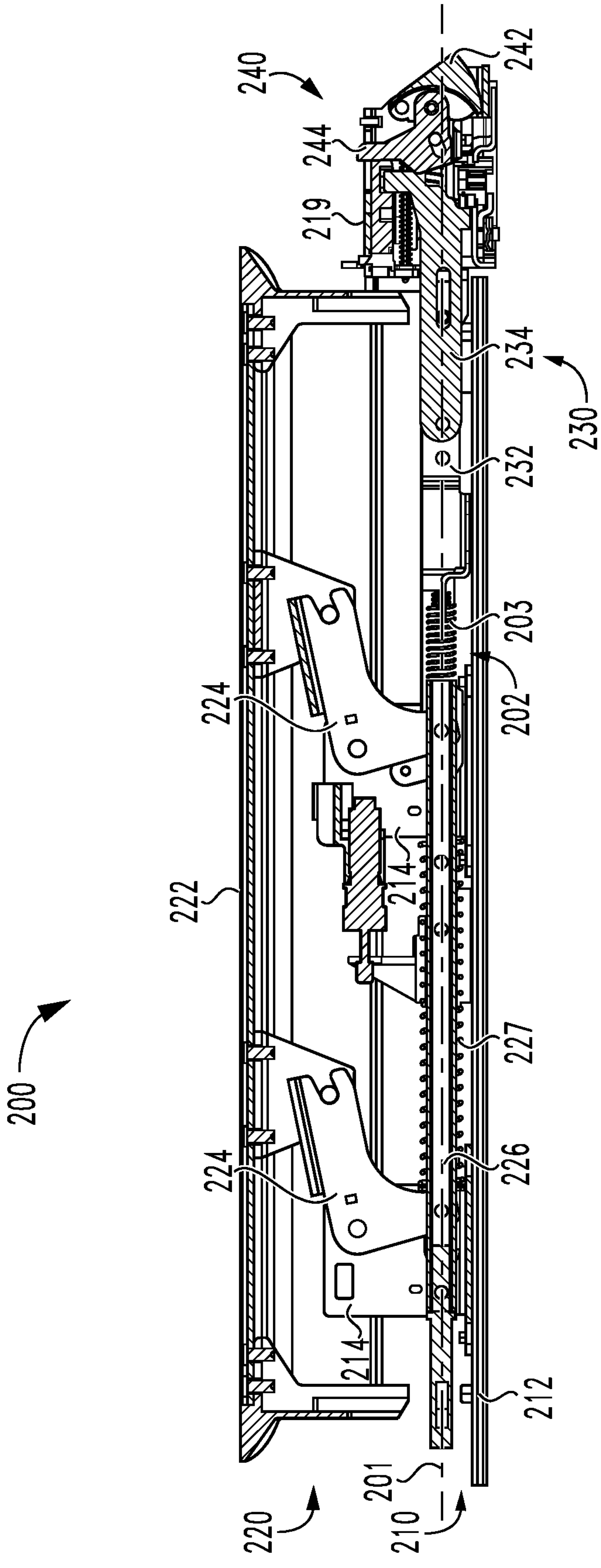
FIG. 3 is a cross-sectional illustration of a pushbar assembly of the exit device assembly illustrated in FIG. 1.

With additional reference to FIG. 3, the pushbar assembly 200 extends along a longitudinal axis 201 defining a proximal direction (to the right in FIG. 3) and an opposite distal direction (to the left in FIG. 3). The pushbar assembly 200 generally includes a mounting assembly 210, a drive assembly 220 movably mounted to the mounting assembly 210, and a latch control assembly 230 operably coupled with the drive assembly 220. In the illustrated form, the pushbar assembly 200 further includes the latch mechanism 240. As described herein, it is also contemplated that an additional or alternative latch mechanism may be positioned elsewhere, such as remotely from the pushbar assembly 200.

The mounting assembly 210 generally includes a longitudinally-extending channel member 211, a mounting plate 212 mounted in the channel member 211, a cover plate 213 enclosing a distal end portion of the channel member 211, a pair of bell crank mounting brackets 214 extending transversely from the mounting plate 212, a header plate 216 positioned adjacent a proximal end of the mounting plate 212, and a header case 217 mounted to the header plate 216.

The drive assembly 220 generally includes a transversely-movable pushbar 222, a pair of bell cranks 224 connecting the pushbar 222 with a longitudinally-movable drive rod 226, and a main spring 227 urging the drive assembly 220 toward a deactuated state. The pushbar 222 is mounted for transverse movement between a projected position and a depressed position to transition the drive assembly 220 between a deactuated state in which the pushbar 222 is in its projected position and an actuated state in which the pushbar 222 is in its depressed position. The bell cranks 224 are mounted to the bell crank brackets 214, and correlate the transverse movement of the pushbar 222 with longitudinal movement of the drive rod 226. More particularly, the bell cranks 224 cause the drive rod 226 to move between a proximal position (to the right in FIG. 3) and a distal position (to the left in FIG. 3) such that the proximal position is correlated with the projected or deactuated position of the pushbar 222 and the distal position is correlated with the depressed or actuated position of the pushbar 222. Additionally, the main spring 227 is engaged between the drive rod 226 and the mounting assembly 210 such that the main spring 227 urges the drive rod 226 toward its proximal position, thereby biasing the drive assembly 220 toward its deactuated state.

The drive assembly 220 is connected with the latch control assembly 230 via a lost motion connection 202 that causes actuation of the latch control assembly 230 in response to actuation of the drive assembly 220, and which permits the drive assembly 220 to remain in its deactuated state when the latch control assembly 230 is actuated by another mechanism (e.g., the trim 100). As a result, the drive assembly 220 is operable to actuate the latch control assembly 230. The lost motion connection 202 may include a bias member such as a spring 203 urging the latch control assembly 230 toward a deactuated state thereof.

Figure 4:
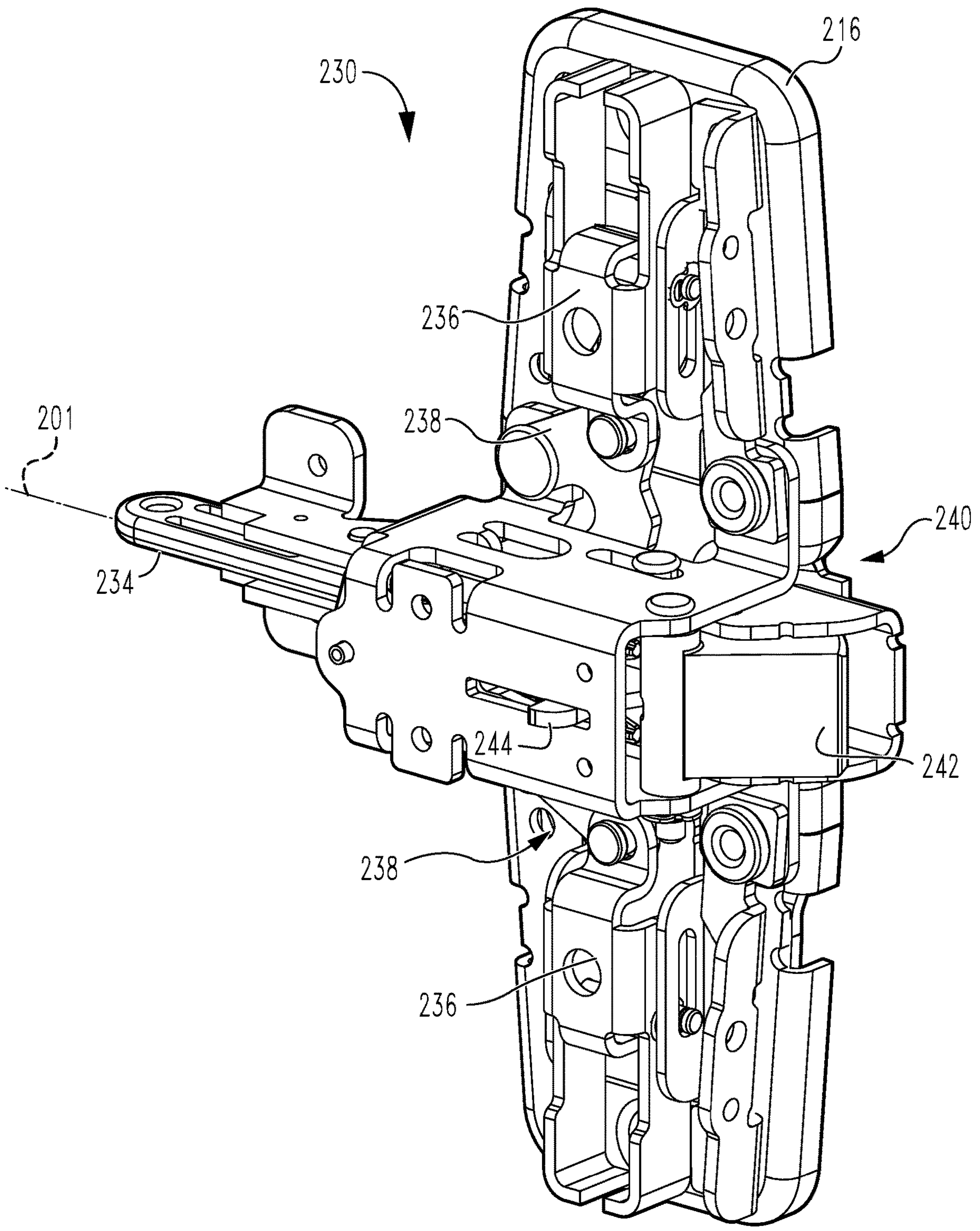
FIG. 4 is a perspective view of a portion of the pushbar assembly illustrated in FIG. 3.

With additional reference to FIG. 4, the latch control assembly 230 generally includes a control link 232 connected with the drive rod 226 via the lost motion connection 202, a yoke 234 connected with the control link 232 for joint movement along the longitudinal axis 201, a pair of drivers 236 mounted to the header plate 316 for lateral movement, and a pair of pivot cranks 238 operably coupling the drivers 236 with the yoke 234. The control link 232 is connected with the drive assembly 220 such that actuation of the drive assembly 220 longitudinally drives the control link 232 and the yoke 234 between a proximal deactuated position and a distal actuated position. The drivers 236 are mounted for lateral movement between a laterally-outward deactuated position and a laterally-inward actuated position, and the pivot cranks 238 correlate the longitudinal movement of the control link 232 and yoke 234 with the lateral movement of the drivers 236.

As used herein, the terms "laterally inward" and "laterally outward" may be used to denote positions and/or motion relative to the longitudinal axis 201. For example, a laterally inward position is one nearer the longitudinal axis 201, and a laterally outward position is one farther from the longitudinal axis 201. Thus, while the laterally inward and laterally outward positions for the upper driver 236 are respectively provided as a lower position and an upper position, the laterally inward and laterally outward positions for the lower driver 236 are respectively provided as an upper position and a lower position. Similarly, laterally inward movement is movement toward the longitudinal axis 201, while laterally outward movement is movement away from the longitudinal axis 201. Thus, laterally inward movement for the upper driver 236 is downward movement, while laterally outward movement for the upper driver 236 is upward movement. Conversely, laterally inward movement for the lower driver 236 is upward movement, while laterally outward movement for the lower driver 236 is downward movement.

As noted above, the pivot cranks 238 correlate longitudinal movement of the control link 232 and the yoke 234 with lateral movement of the drivers 236. More particularly, the pivot cranks 238 correlate distal movement of the control link 232 and the yoke 234 with laterally inward or actuating movement of the drivers 236, and correlate proximal movement of the control link 232 and the yoke 234 with laterally outward or deactuating movement of the drivers 236. The latch control assembly 230 has an actuating state in which each component thereof is in a corresponding and respective actuating position, and a deactuating state in which each component thereof is in a corresponding and respective deactuating position. For the control link 232 and the yoke 234, the actuating position is a distal position, and the deactuating position is a proximal position. For the drivers 236, the actuating position is a laterally inward position, and the deactuating position is a laterally outward position.

The latch mechanism 240 is operably connected with the latch control assembly 230 such that actuating movement of the latch control assembly 230 causes a corresponding actuation of the latch mechanism 240. In the illustrated form, the latch mechanism 240 generally includes a latchbolt 242 and a retractor 244 connecting the latchbolt 242 with the yoke 234 such that distal actuating movement of the yoke 234 drives the latchbolt 242 from an extended position to a retracted position. As described herein, such actuating movement may be imparted to the latch control assembly 230 by the drive assembly 220, and may also be imparted to the latch control assembly 230 by the trim 100.

In the illustrated form, the latch mechanism 240 is installed in the header case 217, and engages the strike 75 when the door 80 is closed and the pushbar assembly 200 is deactuated. It is also contemplated that the exit device assembly 90 may include latch mechanisms in additional or alternative locations. As one example, the exit device assembly 90 may be provided as a vertical exit device assembly including an upper latch mechanism and/or a lower latch mechanism. In such a vertical exit device, the upper latch mechanism may be installed above the pushbar assembly 200 (e.g., adjacent the top edge of the door 80) and connected to the upper driver 236 via an upper connector (e.g., a rod or cable). Additionally or alternatively, a lower latch mechanism may be installed below the pushbar assembly (e.g., adjacent the bottom edge of the door 80) and connected to the lower driver 236 via a lower connector (e.g., a rod or cable). In certain forms, a vertical exit device may be provided as a concealed vertical exit device, in which the connectors run through channels formed within the door 80. In other embodiments, a vertical exit device may be provided as a surface vertical exit device, in which the connectors are mounted to the egress side 82 of the door 80.

Furthermore, while the illustrated latch mechanism 240 drives a latchbolt 242 between an extended position and a retracted position during actuation and deactuation of the latch mechanism 240, other forms of actuation are also contemplated for the latch mechanism 240. As one example, actuation of the latch mechanism may drive a blocking member from a blocking position to an unblocking position to permit retraction of a bolt without directly driving the bolt to the retracted position. In such forms, deactuation of the latch mechanism may tend to return the blocking member to the blocking position such that, when the bolt returns to its extended position, the blocking member once again retains the bolt in that extended position.

Figure 5:
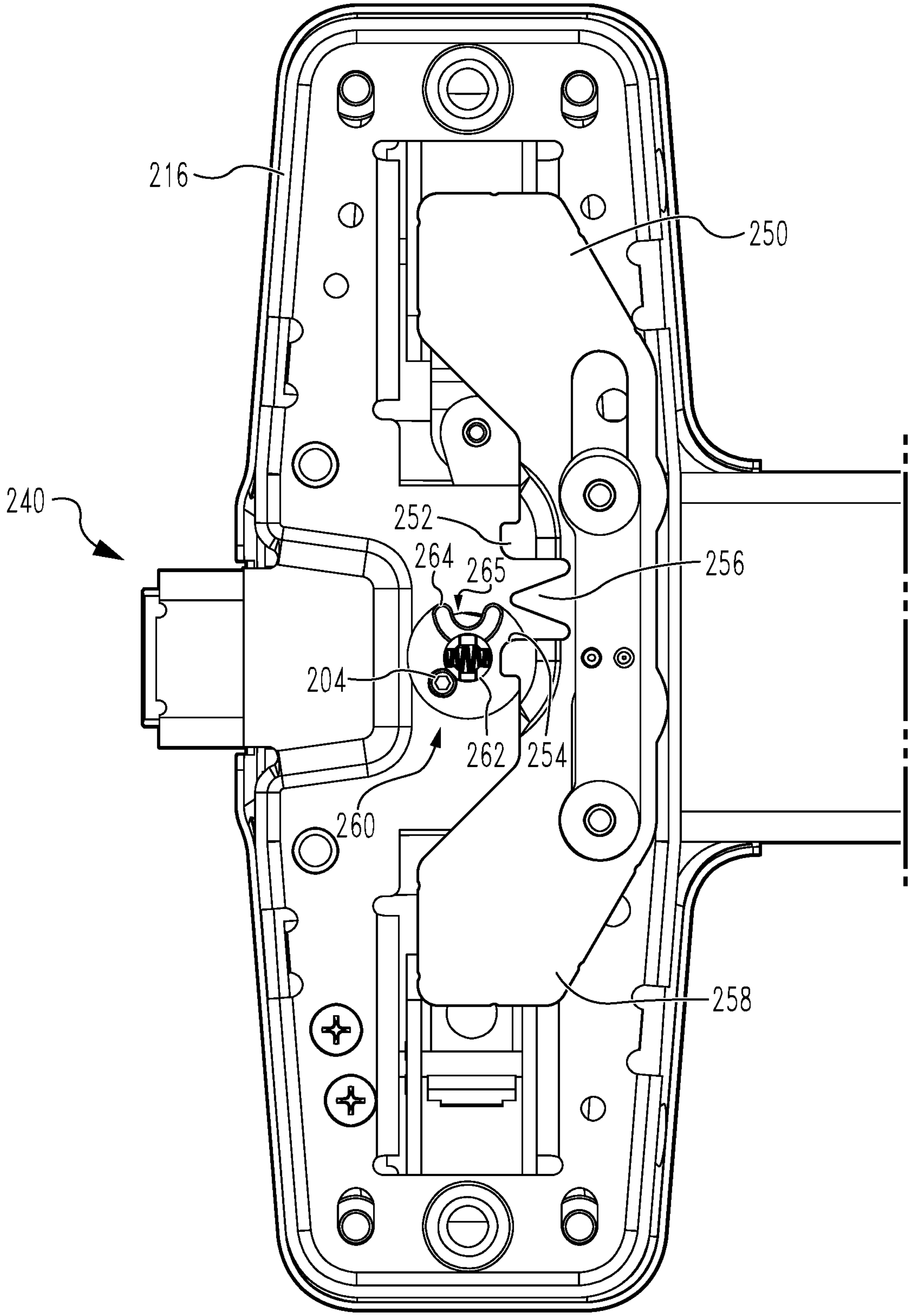
FIG. 5 is a rear view of a portion of the pushbar assembly illustrated in FIG. 3.

With additional reference to FIG. 5, illustrated therein is the rear (i.e., door-facing) side of the header portion of the pushbar assembly 200, which includes a slide plate 250 slidably mounted to the header plate 216, and a master cam 260 rotatably mounted to the header plate 216. As described herein, the slide plate 250 selectively prevents the outside handle 120 from actuating the latch mechanism 240, and the master cam 260 is operable to move the slide plate 250 between a locking position and an unlocking position.

Figure 8:
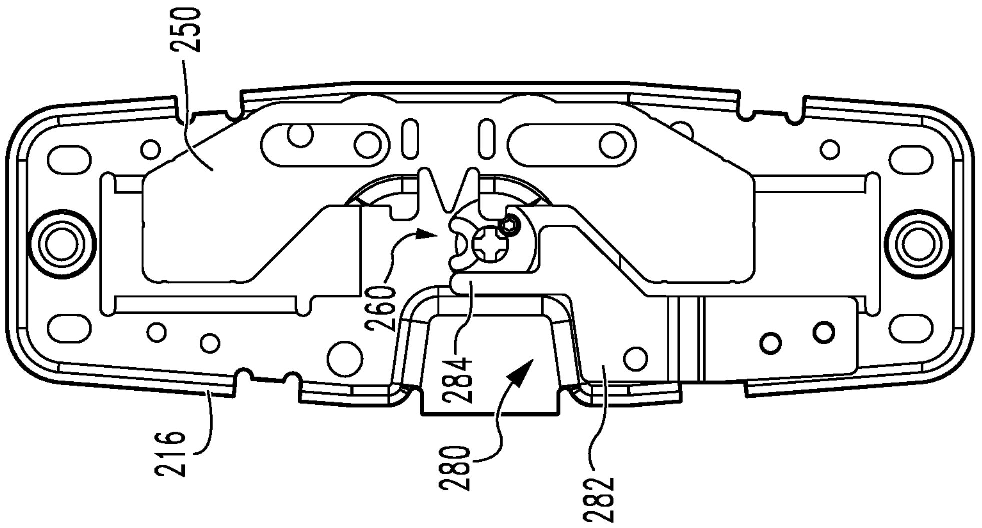
FIG. 8 is a rear view of a portion of the pushbar assembly illustrated in FIG. 3, and illustrates the slide plate in an unlocking position.

The slide plate 250 is slidably mounted to the header plate 216, and generally includes an upper shoulder 252, a lower shoulder 254, and a projection 256 positioned between the shoulders 252. The slide plate 250 is movable between a lower locking position (FIG. 7) and an upper unlocking position (FIG. 8). In the locking position, a lower wing 258 of the slide plate 250 is positioned in the path along which the driven piece 144 of the lift finger 140 travels in response to rotation of the handle 120. As a result, the slide plate 250 blocks the driven piece 144 from actuating the lower driver 236, and the outside trim 100 is inoperable to actuate the latch control assembly 230 for retraction of the latchbolt 242. In the unlocking position, the slide plate 250 does not restrict movement of the driven piece 144, and the outside handle 120 is operable to actuate the latch control assembly 230 for retraction of the latchbolt 242. As described herein, the slide plate 250 is operable to be driven between the locking position and the unlocking position by rotation of the master cam 260.

Figure 7:
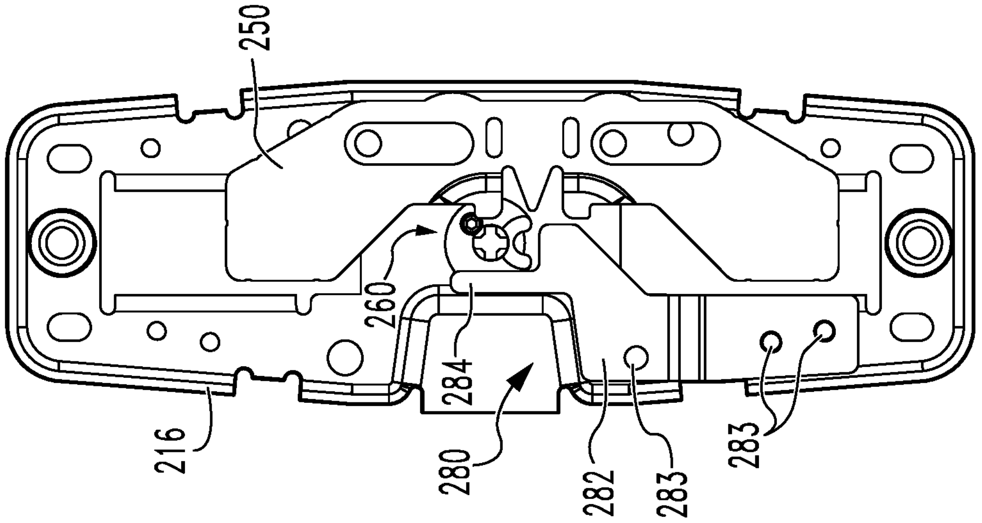
FIG. 7 is a rear view of a portion of the pushbar assembly illustrated in FIG. 3, and illustrates a slide plate in a locking position.

The master cam 260 generally includes an aperture 262 for receiving the tailpiece 166 of the lock cylinder 160, and a lip 264 having a recess 265 defined therein. The master cam 260 has a home position corresponding to the home position of the lock cylinder plug 164, and in which the recess 265 is located at a 6 o'clock position (FIG. 7). When the slide plate 250 is in its lower locking position, rotation of the master cam 260 from the home position in an unlocking direction (counter-clockwise in FIG. 5) causes the lip 264 to engage the upper shoulder 252, thereby driving the slide plate 250 upward from its locking position to its unlocking position. Conversely, when the slide plate 250 is in its upper unlocking position, rotation of the master cam 260 in a locking direction (clockwise in FIG. 5) causes the lip 264 to engage the lower shoulder 254, thereby driving the slide plate 250 downward from its unlocking position to its locking position. When the master cam 260 is in its home position, the plug 164 is likewise in its home position, and the key 169 can be removed from the lock cylinder 160.

Figure 6:
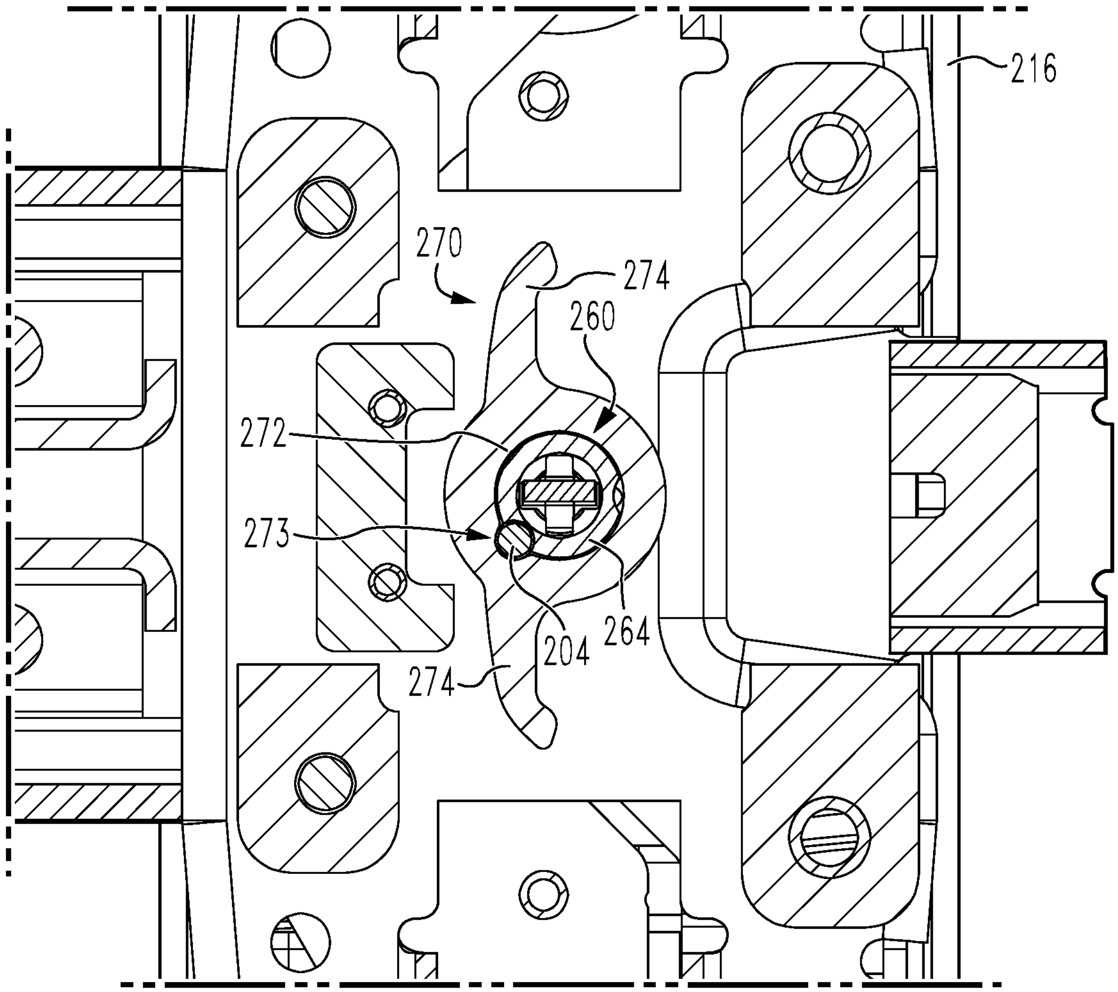
FIG. 6 is a sectional view of a portion of the pushbar assembly illustrated in FIG. 3, and illustrates a night latch cam according to certain embodiments.

With additional reference to FIG. 6, illustrated therein is a portion of the header portion of the pushbar assembly 200, with certain components removed for clarity. The header portion of the pushbar assembly 200 further includes a night latch cam 270, which is rotatably mounted to the header plate 216. As described herein, the night latch cam 270 is selectively coupled with the master cam 260, and is operable to actuate the latch control assembly 230 when rotated.

The night latch cam 270 is rotatably mounted to the header plate 216, and includes an aperture 272 that receives a boss 266 of the master cam 260. The aperture 272 is defined in part by a recess 273 into which a coupler 204 such as a set screw may project to rotationally couple the master cam 260 and the night latch cam 270 for joint rotation. When so coupled, rotation of the master cam 260 through a predetermined angular range causes a corresponding rotation of the night latch cam 270. Such rotation of the night latch cam 270 causes a wing 274 of the night latch cam 270 to actuate the latch control assembly 230 for retraction of the latchbolt 242.

In the arrangement illustrated and thus far described, the exit device assembly 90 has a plurality of configurations, each corresponding to a respective function. In a first configuration, the coupler 204 is not installed, and the master cam 260 is rotatable relative to the night latch cam 270. As a result, actuation of the lock cylinder 160 rotates the master cam 260 to drive the slide plate 250 between its locking position and its unlocking position, but does not actuate the latch control assembly 230. Instead, the latch control assembly 230 is actuated by the handle 120. More particularly, rotation of the handle 120 while the slide plate 250 is in its unlocking position causes the driven piece 144 to raise the lower driver 236, thereby actuating the latch control assembly 230 for retraction of the latchbolt 242. Thus, actuation of the lock cylinder 160 transitions the exit device assembly 90 between a locked state and an unlocked state, but does not cause retraction of the latchbolt 242. This first configuration corresponds to a lock/unlock function for the exit device assembly 90, in which the lock cylinder 160 is operable to move the slide plate 250 between its locking position and its unlocking position to thereby lock and unlock the outside trim 100.

In a second configuration, the coupler 204 is installed, and couples the master cam 260 and the night latch cam 270 for joint rotation. In this configuration, actuation of the lock cylinder 160 rotates both the master cam 260 and the night latch cam 270, thereby actuating the latch control assembly 230 for retraction of the latchbolt 242. It should be noted that in this configuration, the exit device assembly 90 provides a first night latch function. The first night latch function is generally characterized in that rotation of the inserted key 169 retracts the latchbolt 242. As will be appreciated, the tumbler assembly prevents removal of the key 169 until the plug 164 is returned to its home position. Thus, the insertion of the key 169 provides a momentary actuating function in which the latch mechanism 240 can be actuated by the outside trim 100 only when the key 169 is inserted in the lock cylinder 160.

With additional reference to FIGS. 7 and 8, certain embodiments of the pushbar assembly 200 further include an insert 280 that selectively limits rotation of the master cam 260 to a predetermined angular range of less than 360°. As described herein, the insert 280 is operable to be selectively installed to the pushbar assembly 200, and limits the rotation of the master cam 260 when so installed. As described herein, when the insert 280 is installed to the pushbar assembly 200, the master cam 260 is rotatable between a home or locking position (FIG. 7) and a rotated or unlocking position (FIG. 8). With the exit device assembly 90 assembled, the coupler 204 is removed such that the master cam 260 is rotationally decoupled from the night latch cam 270, and the master cam 260 is engaged with the tailpiece 166 such that the home position of the master cam 260 is correlated with the home position of the plug 164 and the rotated position of the master cam 260 is correlated with the rotated position of the plug 164.

The illustrated insert 280 generally includes a base 282 that is secured to the mounting assembly 210, and a finger 284 extending upward from the base 282. The base 282 includes one or more fastener apertures 283 through which one or more fasteners (e.g., screws) may extend to secure the insert 280 to the mounting assembly 210. The finger 284 extends upward from the base 282 to a location adjacent the master cam 260 such that the finger 284 is operable to engage the lip 264 to thereby limit rotation of the master cam 260.

With the insert 280 installed and the master cam 260 in the home or locking position (FIG. 7), the master cam 260 is operable to rotate in an unlocking direction (counter-clockwise in FIGS. 7 and 8). Thus, the lock cylinder 160 is operable to rotate the master cam 260 in the unlocking direction to thereby drive the slide plate 270 to its unlocking position as described above. However, the master cam 260 is blocked from rotating in the locking direction (clockwise in FIG. 7) by the finger 284. As such, rotation of the master cam 280 in the locking direction beyond the locking position is prevented by the insert 280.

With the insert 280 installed and the master cam 260 in the rotated or unlocking position (FIG. 8), the master cam 260 is operable to rotate in the locking direction (clockwise in FIGS. 7 and 8). Thus, the lock cylinder 160 is operable to rotate the master cam 260 in the locking direction to thereby drive the slide plate 270 to its locking position as described above. However, the master cam 260 is blocked from rotating in the unlocking direction by the finger 284. As such, rotation of the master cam 280 in the unlocking direction beyond the unlocking position is prevented by the insert 280.

Figure 9:
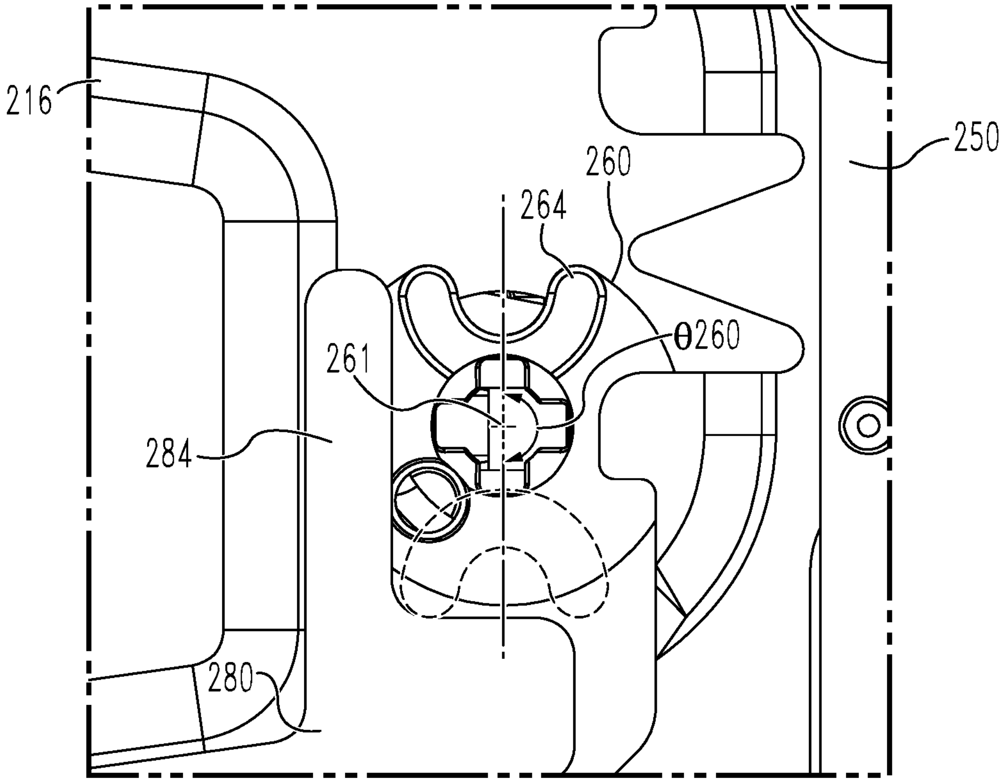
FIG. 9 is a rear view of portion of the pushbar assembly in FIG. 3, and illustrates a master cam in a home position and a rotated position.

With additional reference to FIG. 9, it should be evident from the foregoing that when the insert 280 is installed to the pushbar assembly 200, the master cam 260 is rotatable through a predetermined angular range θ 260 about its rotational axis 261. While other ranges are contemplated, in the illustrated form, the predetermined angular range θ 260 is about 180° (e.g., between 170° and 190°). When the insert 280 is not installed to the pushbar assembly 200, the master cam 260 is operable to rotate through a second predetermined angle greater than the predetermined angular range θ 260. While other forms are contemplated, in the illustrated embodiment, the second predetermined angle is 360° or greater.

It should be appreciated from the foregoing that installation of the insert 280 places the exit device assembly 90 in a third configuration different from the first and second configurations described above. In the third configuration, the exit device assembly 90 provides a second night latch function different from the first night latch function. As noted above, with the exit device assembly 90 providing the first night latch function, rotation of the inserted key 169 actuates the latch control assembly 230 for actuation of the latchbolt mechanism 240. However, it has been found that this first night latch function may suffer from certain drawbacks. For example, because the latch control assembly 230 is being actuated by the key 169, the user must apply sufficient torque to the key 169 to actuate both the latch control assembly 230 and the latch mechanism 240. While the required torque is lower in rim configurations of the exit device assembly 90, the required torque may be greater in other configurations. For example, in vertical rod configurations, the torque applied to the key 169 may need to be sufficient to vertically drive the rod(s) that connect the latch control assembly 230 to the remote latch(es). In some circumstances, this torque may be considerable, and may exceed regulatory requirements (e.g., requirements of the Americans with Disabilities Act and/or similar regulations). As described herein, these drawbacks may be mitigated or eliminated by converting the exit device assembly 90 to the third configuration to thereby provide the second night latch function.

When providing the second night latch function, rotation of the inserted key 169 merely unlocks the exit device assembly 90 such that the outside handle 120 is operable to actuate the latch control assembly 230 for retraction of the latchbolt 242. Since the rotation of the key 169 merely drives the slide plate 270 between its locking position and its unlocking position without actuating the latch control assembly 230, the amount of torque that must be applied to the key 169 is reduced. The force to actuate the latch control assembly 230 is instead provided via the handle 120, which may facilitate the provision of such forces. More particularly, the effective lever arm length for the handle 120 is typically greater than the effective lever arm length for the key 169, such that the amount of force required to provide the requisite torque is less when that torque is supplied via the handle 120 than when the torque is supplied via the key 169. As a result, the amount of force the user needs to apply to the trim 100 is reduced, which may aid in conforming the exit device assembly 90 to regulatory requirements.

It should also be appreciated that because the master cam 260 is limited to rotation between its home locking position and its rotated unlocking position, the lock cylinder plug 164 is likewise limited to rotation between its home position and its rotated position. The key 169 therefore cannot be removed from the lock cylinder 160 when the trim 100 is unlocked, as this unlocked state corresponds to the rotated positions of the master cam 260 and the plug 164. The second night latch function thereby provides a momentary unlock function, in which the handle 120 is operable to actuate the latch control assembly 230 only when the key 169 is inserted and rotated.

Figure 10:
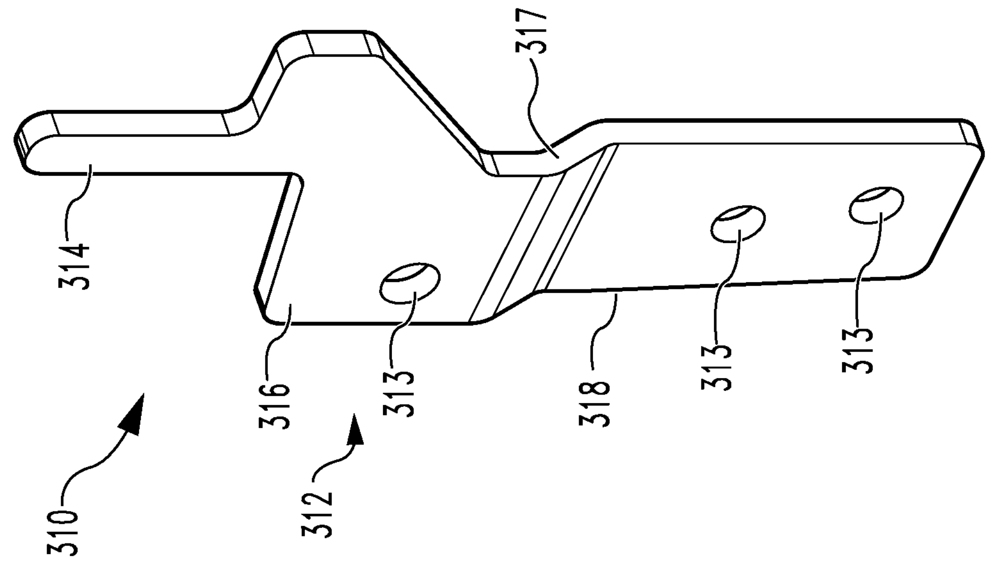
FIG. 10 is a perspective view of an insert according to certain embodiments, which is configured for use in a first handing orientation.

With additional reference to FIG. 10, illustrated therein is an insert 310 according to certain embodiments. The insert 310 may, for example, be utilized as the insert 280 in the pushbar assembly 200, and more particularly in embodiments in which the pushbar assembly 200 is installed in a first handing orientation. The insert 310 includes a base 312 and a finger 314, which respectively correspond to the base 282 and finger 284. The base 312 includes one or more fastener apertures 313 through which fasteners (e.g., screws) may extend to secure the insert 310 to the mounting assembly 210. In the illustrated embodiment, the base 312 includes a first portion 316 extending along a first plane, a second portion 318 extending along a second plane offset from the first plane, and a bend 317 connecting the first portion 316 and the second portion 318. The offset configuration of the base portions 316, 318 may facilitate installation of the insert 310 to the pushbar assembly 200, for example in embodiments in which the mounting assembly 210 includes fastener apertures positioned on two different planes.

Figure 11:
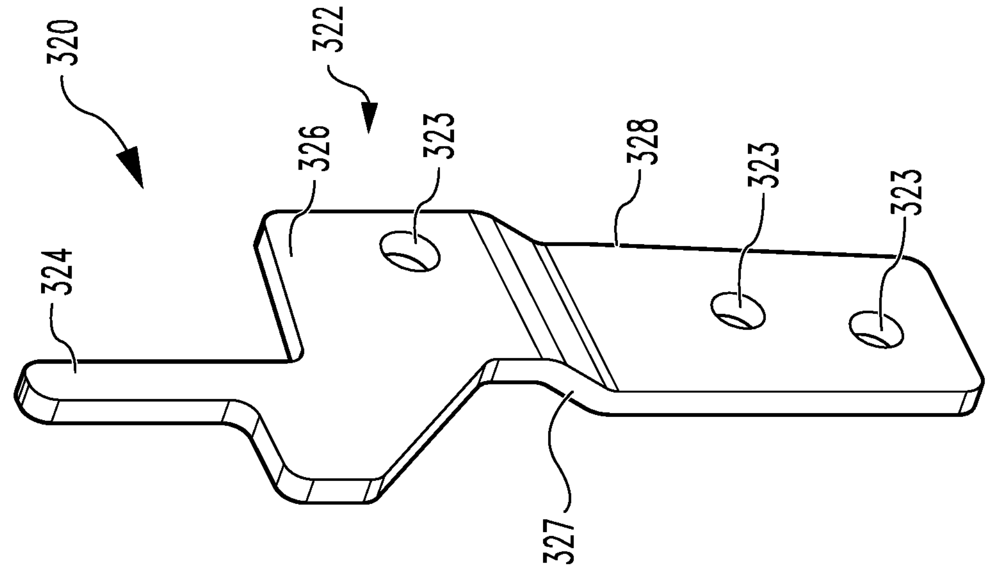
FIG. 11 is a perspective view of an insert according to certain embodiments, which is configured for use in a second handing orientation.

With additional reference to FIG. 11, illustrated therein is an insert 320 according to certain embodiments. The insert 320 may, for example, be utilized as the insert 280 in the pushbar assembly 200, and more particularly in embodiments in which the pushbar assembly 200 is installed in a second handing orientation opposite the first handing orientation. The insert 320 is a mirror image of the insert 310, and generally includes a base 322 and a finger 324, which respectively correspond to the base 312 and finger 314. The base 322 includes one or more fastener apertures 323 through which fasteners (e.g., screws) may extend to secure the insert 320 to the mounting assembly 210. In the illustrated embodiment, the base 322 includes a first portion 326 extending along a first plane, a second portion 328 extending along a second plane offset from the first plane, and a bend 327 connecting the first portion 326 and the second portion 328. The offset configuration of the base portions 326, 328 may facilitate installation of the insert 320 to the pushbar assembly 200, for example in embodiments in which the mounting assembly 210 includes fastener apertures positioned on two different planes.

Figure 13:
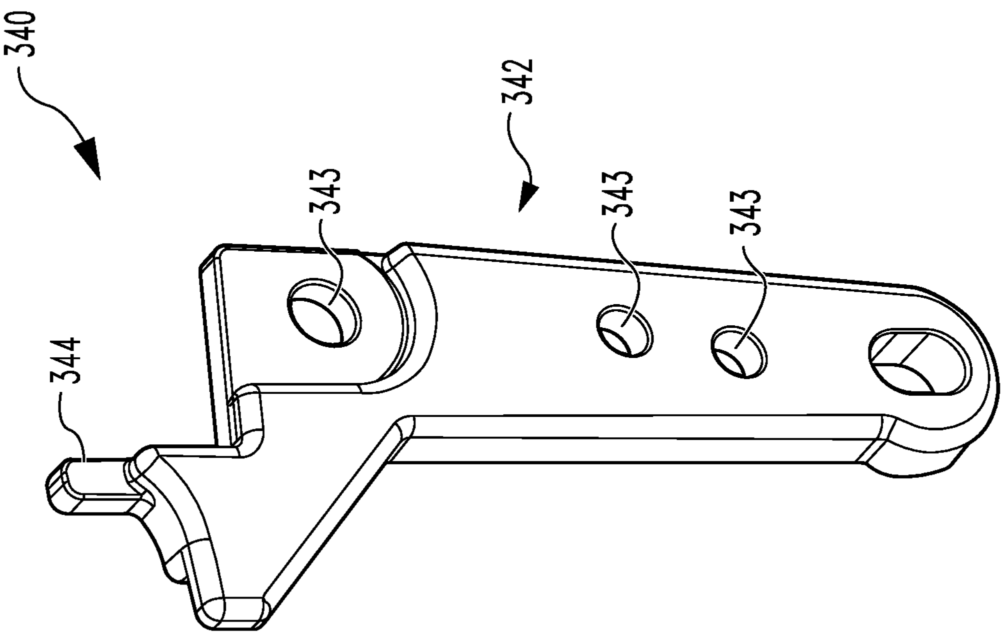
FIG. 13 is a perspective view of an insert according to certain embodiments, which is configured for use in a second handing orientation.
Figure 12:
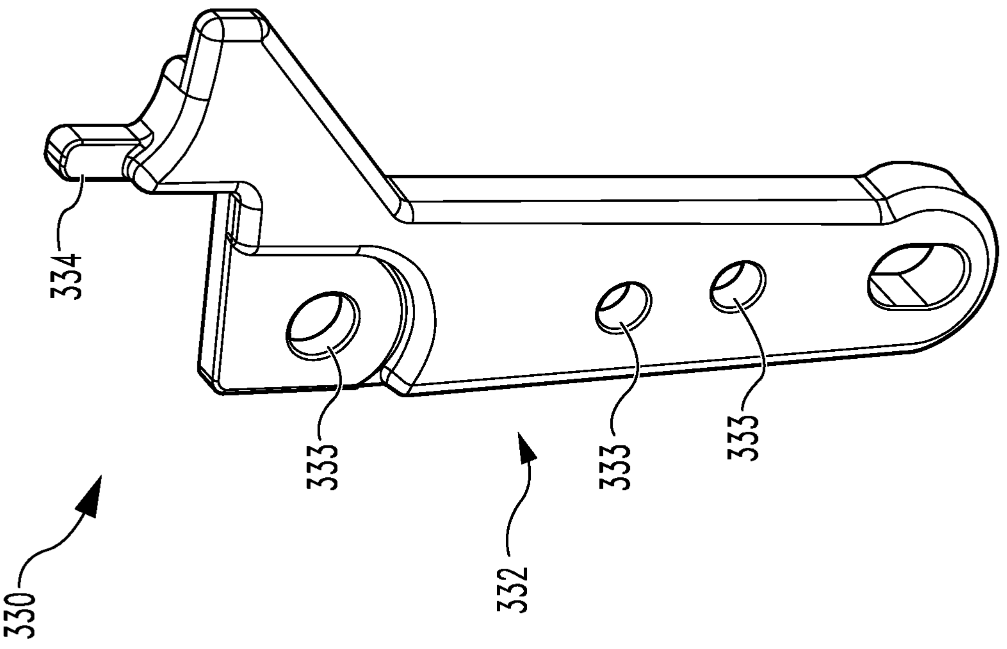
FIG. 12 is a perspective view of an insert according to certain embodiments, which is configured for use in a first handing orientation.

In the illustrated form, each of the inserts 310, 320 is provided as a stamped part. It is also contemplated that the insert 280 may be manufactured via another manufacturing process, such as casting, plastic injection molding, or a powdered metal manufacturing process. Certain example forms of inserts that may be manufactured according to such methods are illustrated in FIGS. 12 and 13. Additionally, while FIGS. 11-14 illustrate handed inserts compatible with a particular handing configurations, it is also contemplated that an insert may be a non-handed insert configured for use with plural handing configurations.

With additional reference to FIG. 12, illustrated therein is an insert 330 according to certain embodiments. The insert 330 may, for example, be utilized as the insert 280 in the pushbar assembly 200, and more particularly in embodiments in which the pushbar assembly 200 is installed in the first handing orientation. The insert 310 includes a base 332 and a finger 334, which respectively correspond to the base 282 and finger 284. The base 332 includes one or more fastener apertures 333 through which fasteners (e.g., screws) may extend to secure the insert 330 to the mounting assembly 210.

With additional reference to FIG. 13, illustrated therein is an insert 340 according to certain embodiments. The insert 340 may, for example, be utilized as the insert 280 in the pushbar assembly 200, and more particularly in embodiments in which the pushbar assembly 200 is installed in the second handing orientation. The insert 340 is a mirror image of the insert 330, and generally includes a base 342 and a finger 344, which respectively correspond to the base 332 and finger 344. The base 342 includes one or more fastener apertures 343 through which fasteners (e.g., screws) may extend to secure the insert 340 to the mounting assembly 210.

Figure 14:
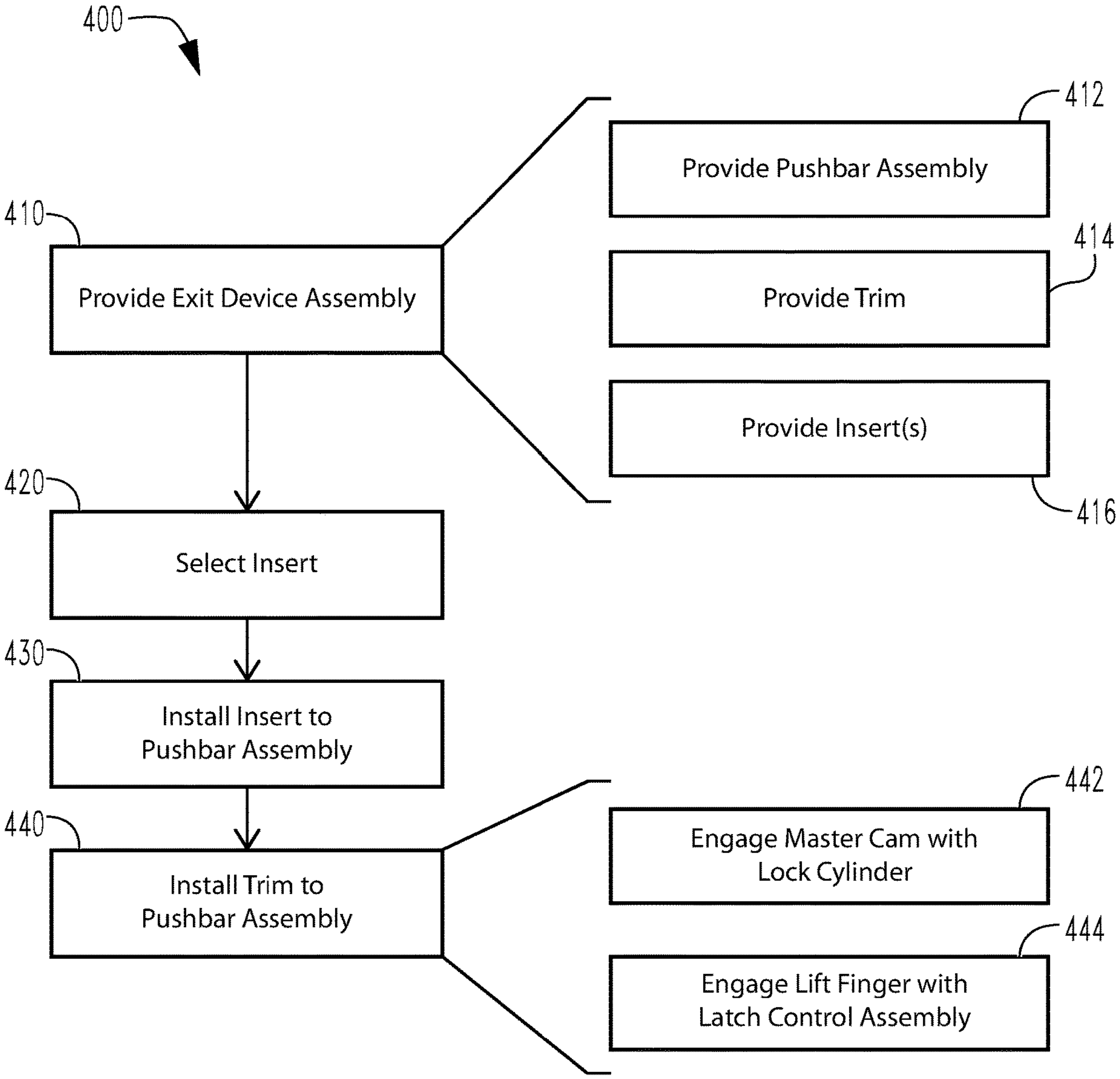
FIG. 14 is a schematic flow diagram of a process according to certain embodiments.

With additional reference to FIG. 14, an exemplary process 400 that may be performed using the exit device assembly 90 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 400 is described herein with specific reference to the exit device assembly 90 and insert 280 illustrated in FIGS. 1-9, it is to be appreciated that the process 400 may be performed with exit device assemblies and/or inserts having additional and/or alternative features.

The process 400 may include block 410, which generally involves providing an exit device assembly 90. Block 410 may include block 412, which generally involves providing a pushbar assembly including a slide plate and a master cam operable to drive the slide plate between a locking position and an unlocking position. For example, block 412 may involve providing the pushbar assembly 200, which includes a slide plate 250 and a master cam 260 operable to drive the slide plate between a locking position and an unlocking position. In embodiments in which the coupler 204 is installed, block 412 may also involve removing the coupler 204, or moving the coupler to a position in which the master cam 260 is rotationally decoupled from the night latch cam 270.

Block 410 may include block 414, which generally involves providing a trim including a manual actuator and a lock cylinder. For example, block 410 may involve providing the trim 100, which includes a manual actuator in the form of a handle 120 and a lock cylinder 160. It is also contemplated that the manual actuator may be provided in another form, such as that of a thumb latch.

Block 410 may include block 416, which generally involves providing one or more inserts. In certain embodiments, such as those in which the insert is non-handed, block 416 may involve providing a single insert. In certain embodiments, such as those in which the inserts are handed, block 416 may involve providing plural inserts. For example, block 416 may involve providing a first insert (e.g., the insert 310 or the insert 330) corresponding to a first handing configuration, and providing a second insert (e.g., the insert 320 or the insert 340) corresponding to a second handing configuration.

In certain embodiments, such as those in which the insert is a handed insert, the process 400 may include block 420, which generally involves selecting an insert. In certain embodiments, block 420 may involve selecting the insert based upon a handing of the exit device assembly 90. For example, in embodiments in which the exit device assembly 90 is provided in a first handing configuration (e.g., right-handed), block 420 may involve selecting the insert 310 or the insert 330, each of which is configured for use with the first handing configuration. Conversely, when the exit device assembly 90 is provided in a second handing configuration (e.g., left-handed), block 420 may involve selecting the insert 320 or the insert 340, each of which is configured for use with the second handing configuration. It is also contemplated that block 420 may be omitted, for example in embodiments in which the insert 280 is non-handed.

The process 400 typically includes block 430, which generally involves installing an insert to the pushbar assembly. Block 430 may, for example, involve installing the insert 280 by engaging fasteners with the mounting assembly 210 via the fastener apertures 283. With the insert 280 installed, the insert 280 limits rotation of the master cam 260 to a predetermined angular range θ 260 of less than 360°. In the illustrated form, the predetermined angle θ 260 is about 180° (e.g., between 170° and 190°). It is also contemplated that other predetermined angles may be utilized, so long as the master cam 260 remains capable of driving the slide plate 250 between its locking position and its unlocking position.

In certain embodiments, rotation of the master cam 260 in an unlocking direction from a locking orientation (FIG. 7) to an unlocking orientation (FIG. 8) drives the slide plate 250 from the locking position to the unlocking position, and the installed insert 280 blocks rotation of the master cam 260 in the unlocking direction beyond the unlocking orientation. In certain embodiments, rotation of the master cam 260 in a locking direction from an unlocking orientation (FIG. 8) to a locking orientation (FIG. 7) drives the slide plate 250 from the unlocking position to the locking position, and the installed insert 280 blocks rotation of the master cam 260 in the locking direction beyond the locking orientation.

In certain embodiments, the process 400 may include block 440, which generally involves installing a trim to the pushbar assembly. In such forms, block 440 may include block 442, which generally involves engaging the master cam with a tailpiece of a lock cylinder of the trim. For example, block 442 may involve engaging the master cam 260 with the tailpiece 166 of the lock cylinder 160 such that the lock cylinder 160 is operable to rotate the master cam 260. As noted above, the lock cylinder plug 164 has a home position corresponding to the locking orientation of the master cam 260 and a rotated position corresponding to the unlocking orientation of the master cam 260. Additionally, the lock cylinder 160 includes a tumbler assembly configured to selectively prevent rotation of the plug 164 from its home position, and to prevent removal of an inserted key 169 when the plug 164 is in the rotated position corresponding to the unlocking orientation of the master cam 260.

Block 440 may additionally or alternatively include block 444, which generally involves engaging a lift finger with the latch control assembly 230. When so engaged, the latch control assembly 230 actuates in response to movement of the lift finger 140 from a deactuated position to an actuated position, which movement may be initiated by a manual actuator (e.g., the handle 120). Additionally, the slide plate 250 selectively prevents actuation of the latch control assembly 230 by the lift finger 140. More particularly, the slide plate 250, when in the locking position, prevents the lift finger 140 from reaching the actuated position, thereby preventing the manual actuator 120 from actuating the latch control assembly 230. When the slide plate 250 is in the unlocking position, the manual actuator 120 is operable to move the lift finger 140 to its actuated position, thereby actuating the latch control assembly 230.

Figure 15:
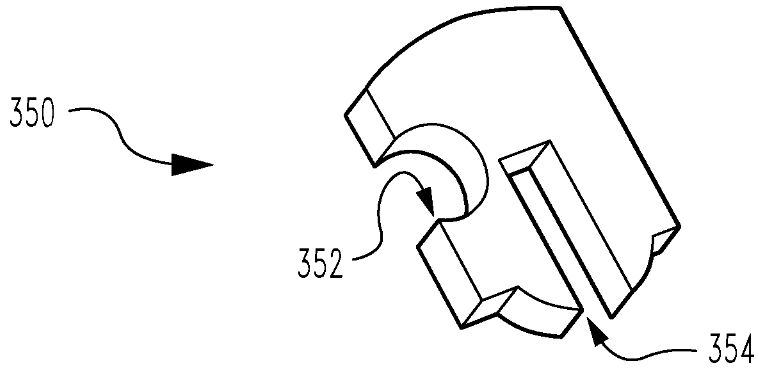
FIG. 15 is a perspective view of an insert according to certain embodiments.

With additional reference to FIG. 15, illustrated therein is an insert 350 according to certain embodiments. The insert 350 may, for example, be utilized in the pushbar assembly 200 in lieu of the insert 280. As described herein, the insert 350 is configured for installation to the master cam 260, and is operable to limit rotation of the master cam 260 when so installed.

The insert 350 is configured for installation to the master cam 260, and generally includes an aperture 352 and a slot 354. The aperture 352 is configured to align with the coupler 204 such that the coupler 204 remains accessible. In certain embodiments, the aperture 352 may be threaded such that the coupler 204 is operable to couple the insert 350 with the master cam 260. It is also contemplated that the insert 350 may be coupled to the master cam 260 via additional or alternative coupling devices, such as an adhesive. The slot 354 is configured to receive the tailpiece 166 of the lock cylinder 160 such that the tailpiece 166 can extend into the tailpiece-receiving aperture 262 via the slot 354.

Figure 16:
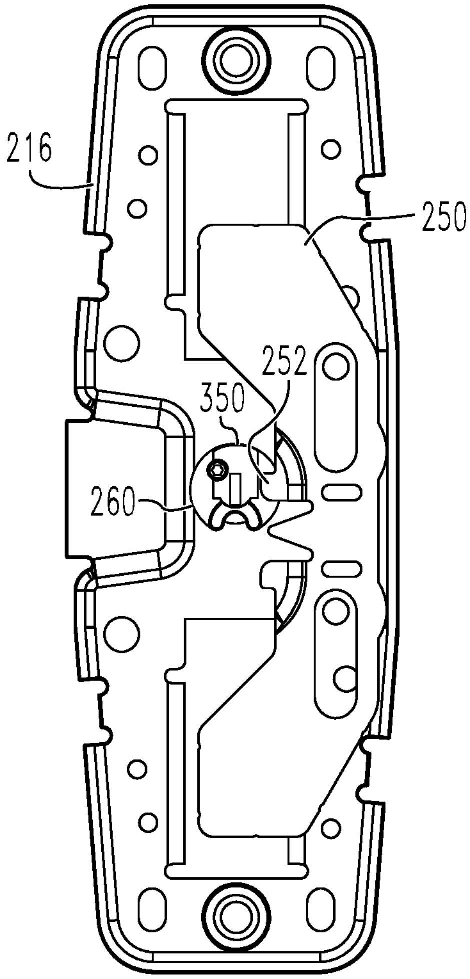
FIG. 16 is a rear view of a portion of a pushbar assembly including the insert illustrated in FIG. 15, and illustrates the slide plate in the locking position.

With additional reference to FIG. 16, illustrated therein is the insert 350 installed to the master cam 260 with the master cam 260 in its home position or locking orientation. In this state, the insert 350 is aligned with the upper shoulder 252 such that the upper shoulder 252 blocks further rotation of the master cam 260 in the locking direction (clockwise in FIG. 16).

Figure 17:
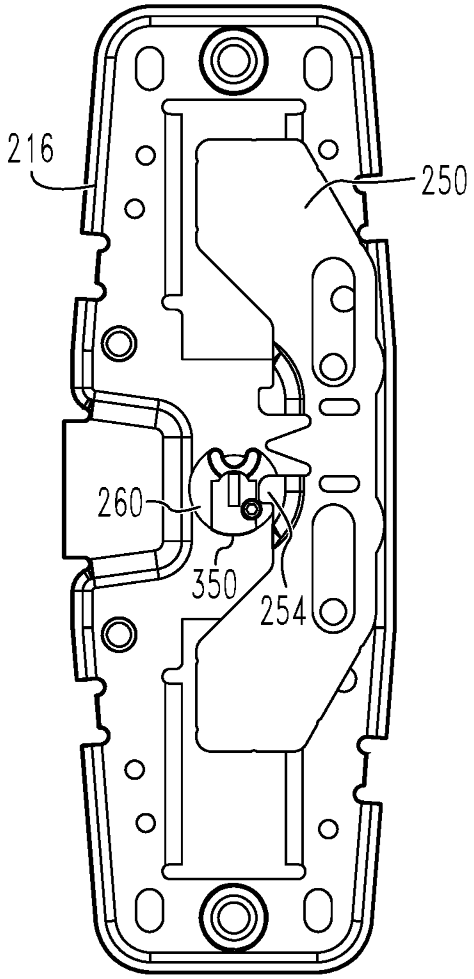
FIG. 17 is a rear view of a portion of a pushbar assembly including the insert illustrated in FIG. 15, and illustrates the slide plate in the unlocking position.

With additional reference to FIG. 17, illustrated therein is the insert 350 installed to the master cam 260 with the master cam 260 in its rotated position or unlocking orientation. In this state, the insert 350 is aligned with the lower shoulder 254 such that the lower shoulder 254 blocks further rotation of the master cam 260 in the unlocking direction (counter-clockwise in FIG. 17).

As should be evident from the foregoing, the insert 350 is operable to be installed to the pushbar assembly 200 to limit rotation of the master cam 260 to a predetermined angular range. The insert 350 may thus be used in a process similar to the above-described process 400 to provide the exit device assembly 90 with the second night latch function.

Figure 18:
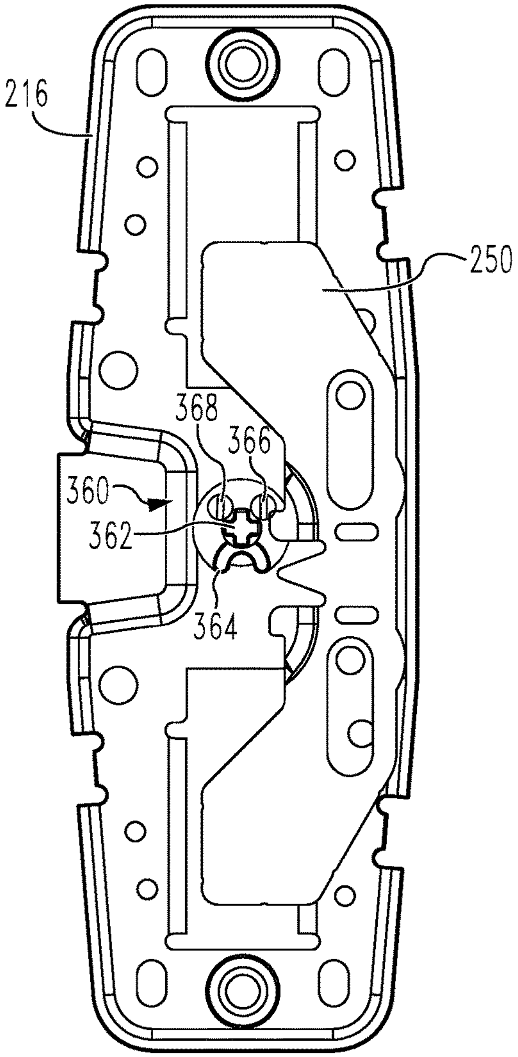
FIG. 18 is a rear view of a portion of a pushbar assembly according to certain embodiments, and illustrates the slide plate in the locking position.
Figure 19:
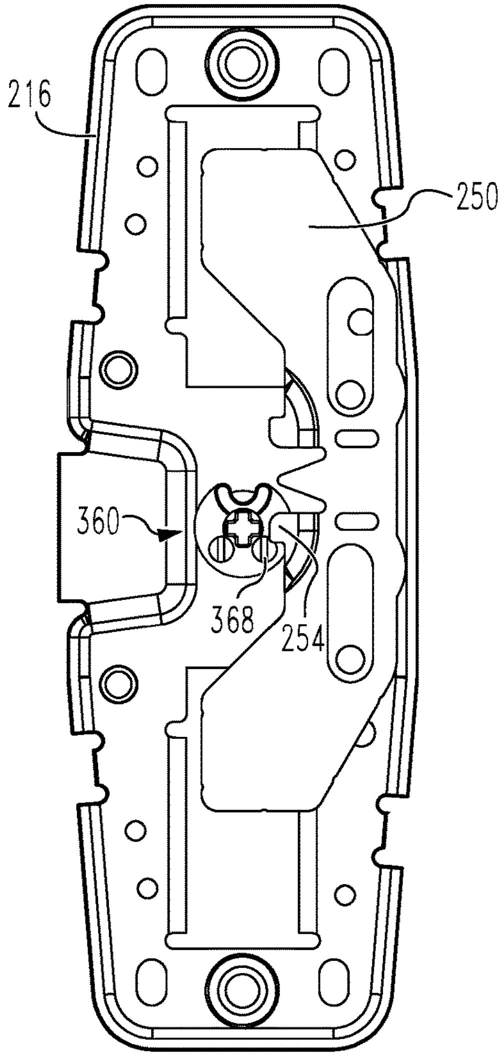
FIG. 19 is a rear view of a portion of a pushbar assembly according to certain embodiments, and illustrates the slide plate in the unlocking position.

With additional reference to FIGS. 18 and 19, illustrated therein is a master cam 360 according to certain embodiments in a locking orientation (FIG. 18) and an unlocking orientation (FIG. 19). The illustrated master cam 360 is similar in configuration to the master cam 260, and includes an aperture 362 and a lip 364 corresponding to the aperture 262 and lip 264 of the master cam 260. The illustrated master cam 360 further includes a pair of stops 366, 368 operable to engage the slide plate 250 to limit rotation of the master cam 360. In the illustrated form, each stop 366, 368 is defined on a corresponding and respective projection of the master cam 366. It is also contemplated that both stops 366, 368 may be defined on a single projection of the master cam 360.

When the master cam 360 is in the locking orientation (FIG. 18), the first stop 366 engages the upper shoulder 252 to block further rotation of the master cam 360 in the locking direction (clockwise in FIG. 18). When the master cam 360 is in the unlocking orientation (FIG. 19), the second stop 368 engages the lower shoulder 254 to block further rotation of the master cam 360 in the unlocking direction (counter-clockwise in FIG. 19).

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A pushbar assembly, comprising:

a mounting assembly;

a latch control assembly movably mounted to the mounting assembly;

a pushbar operable to actuate the latch control assembly;

a master cam rotatably mounted to the mounting assembly;

a slide plate slidably mounted to the mounting assembly, wherein the slide plate is configured to move between a locking position and an unlocking position in response to rotation of the master cam between a locking orientation and an unlocking orientation; and an insert configured to limit rotation of the master cam to a predetermined angular range less than 360° when the insert is removably coupled to the mounting assembly;

wherein, with the insert removably coupled to the mounting assembly, the insert is secured in a fixed position and orientation relative to the mounting assembly such that movement of the insert relative to the mounting assembly is prevented;

wherein the pushbar assembly is convertible between a first configuration and a second configuration;

wherein with the pushbar assembly in the first configuration, the insert is not installed to the pushbar assembly and the master cam is rotatable through a second angular range greater than the predetermined angular range; and wherein the master cam is operable to drive the slide plate between the locking position and the unlocking position both when the pushbar assembly is in the first configuration and when the pushbar assembly is in the second configuration.

2. A pushbar assembly, comprising:

a mounting assembly;

a latch control assembly movably mounted to the mounting assembly;

a pushbar operable to actuate the latch control assembly;

a master cam rotatably mounted to the mounting assembly;

a slide plate slidably mounted to the mounting assembly, wherein the slide plate is configured to move between a locking position and an unlocking position in response to rotation of the master cam between a locking orientation and an unlocking orientation; and an insert configured to limit rotation of the master cam to a predetermined angular range less than 360° when the insert is removably coupled to the mounting assembly;

wherein the insert comprises a plurality of fastener apertures, and wherein the insert is removably coupled to the mounting assembly via a plurality of fasteners that extend through the plurality of fastener apertures; and wherein, with the insert removably coupled to the mounting assembly, the insert is secured in a fixed position and orientation relative to the mounting assembly such that movement of the insert relative to the mounting assembly is prevented.

3. The pushbar assembly of claim 1, wherein the insert comprises a base and a finger extending from the base;

wherein the base is secured to the mounting assembly; and wherein the finger is operable to engage the master cam to thereby limit rotation of the master cam to the predetermined angular range.

4. The pushbar assembly of claim 1, wherein the predetermined angular range is between 170° and 190°.

5. An exit device assembly comprising the pushbar assembly of claim 1, the exit device assembly further comprising a trim;

wherein the trim comprises:

a lock cylinder operable to rotate the master cam between the locking orientation and the unlocking orientation;

a lift finger; and a manual actuator operable to move the lift finger;

wherein, with the slide plate in the unlocking position, the lift finger is operable to actuate the latch control assembly; and wherein, with the slide plate in the locking position, the lift finger is inoperable to actuate the latch control assembly.

6. The exit device assembly of claim 5, wherein the lock cylinder is operable to rotate the master cam when a correct key is inserted into a plug of the lock cylinder;

wherein the lock cylinder is configured to permit removal of the key from the plug when the plug is in a home position, and to prevent removal of the key from the plug when the plug is in a rotated position;

wherein the master cam has the locking orientation when the plug is in the home position; and wherein the master cam has the unlocking orientation when the plug is in the rotated position.

7. A method of modifying a pushbar assembly comprising a slide plate and a master cam operable to drive the slide plate between a locking position and an unlocking position, the method comprising:

converting the pushbar assembly from a first configuration to a second configuration, comprising installing an insert to the pushbar assembly such that the insert limits rotation of the master cam to a predetermined angular range of less than 360°;

wherein, with the pushbar assembly in the first configuration, the insert is not installed to the pushbar assembly and the master cam is rotatable through a second angular range greater than the predetermined angular range; and wherein the master cam is operable to drive the slide plate between the locking position and the unlocking position both when the pushbar assembly is in the first configuration and when the pushbar assembly is in the second configuration.

8. The method of claim 7, wherein rotation of the master cam in an unlocking direction from a locking orientation to an unlocking orientation drives the slide plate from the locking position to the unlocking position; and wherein the installed insert blocks rotation of the master cam in the unlocking direction beyond the unlocking orientation.

9. The method of claim 7, wherein rotation of the master cam in a locking direction from an unlocking orientation to a locking orientation drives the slide plate from the unlocking position to the locking position; and wherein the installed insert blocks rotation of the master cam in the locking direction beyond the locking orientation.

10. The method of claim 7, wherein the predetermined angular range is between 170° and 190°.

11. The method of claim 7, further comprising engaging the master cam with a tailpiece of a lock cylinder; and wherein the lock cylinder further comprises a plug operable to rotate the tailpiece.

12. The method of claim 11, wherein the plug has a home position and a rotated position; and wherein, with the master cam engaged with the tailpiece, the home position of the plug is correlated with the locking position of the master cam, and the rotated position of the plug is correlated with the unlocking position of the master cam.

13. The method of claim 12, wherein the lock cylinder is further configured to selectively prevent rotation of the plug from the home position;

wherein the plug is operable to rotate when a correct key is inserted into the plug; and wherein the lock cylinder prevents removal of the correct key from the plug when the plug is not in the home position.

14. The method of claim 7, further comprising:

engaging a trim with the pushbar assembly;

wherein the trim comprises a lift finger and a manual actuator operable to drive the lift finger from an unactuated position to an actuated position;

wherein engaging the trim with the pushbar assembly comprises engaging the lift finger with a latch control assembly such that the latch control assembly actuates in response to movement of the lift finger from the unactuated position to the actuated position; and wherein the slide plate in the locking position prevents the lift finger from reaching the actuated position, thereby preventing the manual actuator from actuating the latch control assembly.

15. The method of claim 14, wherein the trim further comprises a lock cylinder, the lock cylinder including a tailpiece and a plug operable to rotate the tailpiece; and wherein engaging the trim with the pushbar assembly further comprises engaging the tailpiece with the master cam such that the plug is operable to rotate the master cam.

16. The method of claim 7, wherein the converting further comprises decoupling the master cam from a night latch cam of the pushbar assembly.

17. An exit device assembly, comprising:

a trim configured for mounting to a non-egress side of a door, the trim comprising a lock cylinder and a manual actuator;

a pushbar assembly configured for mounting to an egress side of the door, the pushbar assembly comprising a master cam and a removable insert; and a latch mechanism operable to be actuated by the pushbar assembly;

wherein the exit device assembly has a first night latch configuration in which the removable insert is not installed to the pushbar assembly, and the lock cylinder is operable to actuate the latch mechanism to change a latched/unlatched state of the exit device assembly; and wherein the exit device assembly has a second night latch configuration in which the removable insert is installed to the pushbar assembly and limits rotation of the master cam to a predetermined angle less than 360°, and the lock cylinder is operable to change a locked/unlocked state of the exit device assembly to thereby selectively permit the manual actuator to change the latched/unlatched state of the exit device assembly.

18. The exit device assembly of claim 17, wherein, with the exit device assembly installed to the door, the lock cylinder and the manual actuator are positioned on the non-egress side of the door, and the master cam and the removable insert are positioned on the egress side of the door.

19. The exit device assembly of claim 17, wherein, with the exit device assembly in the second night latch configuration, the insert permits momentary unlocking of the exit device assembly and prevents persistent unlocking of the exit device assembly.

20. The exit device assembly of claim 19, wherein momentary unlocking requires presence of a key in the lock cylinder, and wherein persistent unlocking permits removal of the key from the lock cylinder.

21. The method of claim 7, wherein, with the pushbar assembly mounted to an egress side of a door, the pushbar assembly, the slide plate, the master cam, and the insert are positioned on a same side of a plane defined by the egress side of the door.

22. The method of claim 7, further comprising converting the pushbar assembly from the second configuration to the first configuration, comprising removing the insert from the pushbar assembly such that the master cam is rotatable through the second angular range.

23. The method of claim 7, wherein installing an insert to the pushbar assembly comprises securing the insert in a fixed position and orientation on the pushbar assembly.

24. A pushbar assembly, comprising:

a mounting assembly;

a latch control assembly movably mounted to the mounting assembly;

a pushbar operable to actuate the latch control assembly;

a master cam rotatably mounted to the mounting assembly;

a slide plate slidably mounted to the mounting assembly, wherein the slide plate is configured to move between a locking position and an unlocking position in response to rotation of the master cam between a locking orientation and an unlocking orientation; and an insert configured to limit rotation of the master cam to a predetermined angular range less than 360° when the insert is removably coupled to the mounting assembly;

wherein, with the insert removably coupled to the mounting assembly, the insert is secured in a fixed position and orientation relative to the mounting assembly such that movement of the insert relative to the mounting assembly is prevented; and wherein the slide plate is configured to move between the locking position and the unlocking position in response to rotation of the master cam between the locking orientation and the unlocking orientation both when the insert is removably coupled to the mounting assembly and when the insert is removed from the mounting assembly.

* * * * *